US012202709B2

(12) United States Patent
Hofmeister et al.

(10) Patent No.: US 12,202,709 B2
(45) Date of Patent: Jan. 21, 2025

(54) METHOD AND DEVICE FOR DETECTING THE SET-UP STATE OF A CONSTRUCTION AND/OR MATERIAL-HANDLING MACHINE

(71) Applicant: Liebherr-Werk Biberach GmbH, Biberach an der Riss (DE)

(72) Inventors: Markus Hofmeister, Biberach an der Riss (DE); Tobias Englert, Laupheim (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 266 days.

(21) Appl. No.: 17/650,367

(22) Filed: Feb. 8, 2022

(65) Prior Publication Data

US 2022/0162044 A1 May 26, 2022

Related U.S. Application Data

(63) Continuation of application No. PCT/EP2020/071856, filed on Aug. 4, 2020.

(30) Foreign Application Priority Data

Aug. 13, 2019 (DE) ..................... 10 2019 121 746.6

(51) Int. Cl.
*B66C 23/90* (2006.01)
*B66C 13/46* (2006.01)

(52) U.S. Cl.
CPC .................................... *B66C 13/46* (2013.01)

(58) Field of Classification Search
USPC ...................... 340/685, 8.1, 568.1, 552, 567, 340/572.1–572.9, 588, 686.1, 687, 691.1,
(Continued)

(56) References Cited

U.S. PATENT DOCUMENTS 7,181,370 B2 * 2/2007 Furem ..................... E02F 9/205 701/50
2005/0248454 A1 11/2005 Hanson et al.
(Continued)

FOREIGN PATENT DOCUMENTS

CN 108092415 5/2018
CN 109153549 1/2019
(Continued)

*Primary Examiner* — Daniel Previl
(74) *Attorney, Agent, or Firm* — Levine Bagade Han LLP

(57) ABSTRACT

The present invention relates to a method and a device for detecting the set-up state of a construction and/or material-handling machine, in particular a crane, and/or the location of individual set-up elements of the construction and/or material-handling machine, with electronic identification elements which are attached to the set-up elements of the construction and/or material-handling machine, and an electronic evaluation unit for determining the set-up state and/or location of the set-up elements based on information received from the identification elements. The invention further also relates to such a construction and/or material-handling machine, in particular in the form of a crane. According to the invention the identification elements attached to the set-up elements are provided with energy-generating means for generating electrical energy from environmental influences, as well as an energy accumulator for storing the generated energy and supplying the identification elements.

31 Claims, 5 Drawing Sheets

(58) Field of Classification Search
USPC ................................ 340/693.1, 693.2, 693.4
See application file for complete search history.

(56) References Cited

U.S. PATENT DOCUMENTS

| | | | | |
|---|---|---|---|---|
| 2006/0042339 | A1* | 3/2006 | Denkmeier ............ | B21D 55/00<br>72/15.1 |
| 2007/0138333 | A1 | 6/2007 | Ziemek et al. | |
| 2010/0039317 | A1 | 2/2010 | Cameron | |
| 2010/0282835 | A1* | 11/2010 | Wakamoto .............. | G09F 13/18<br>235/375 |
| 2011/0133886 | A1* | 6/2011 | Monig ................... | G07C 5/008<br>340/5.61 |
| 2013/0299440 | A1* | 11/2013 | Hermann .............. | B66C 15/065<br>340/8.1 |
| 2014/0116975 | A1* | 5/2014 | Benton ................... | B66C 23/78<br>212/302 |
| 2016/0041030 | A1 | 2/2016 | Saxena et al. | |

FOREIGN PATENT DOCUMENTS

| | | |
|---|---|---|
| DE | 10120100 | 10/2002 |
| DE | 202010011345 U1 | 11/2010 |
| DE | 202010017142 | 3/2011 |
| DE | 102007017461 | 4/2014 |
| DE | 102012025111 | 6/2014 |
| DE | 102014018063 | 6/2016 |
| DE | 102015016856 | 6/2017 |
| EP | 1724230 | 3/2009 |
| EP | 2799386 | 11/2016 |
| WO | WO 2017/162336 | 9/2017 |
| WO | WO 2019/014691 | 1/2019 |
| WO | WO 2021/028258 | 2/2021 |

* cited by examiner

METHOD AND DEVICE FOR DETECTING THE SET-UP STATE OF A CONSTRUCTION AND/OR MATERIAL-HANDLING MACHINE

CROSS-REFERENCE TO RELATED APPLICATIONS

This application is a continuation of International Patent Application Number PCT/EP2020/071856 filed Aug. 4, 2020, which claims priority to German Patent Application Number DE 10 2019 121 746.6 filed Aug. 13, 2019, both of which are incorporated herein by reference in their entireties.

BACKGROUND

The present invention relates to a method and a device for detecting the set-up state of a construction and/or material-handling machine, in particular a crane, and/or the location of individual set-up elements of the construction and/or material-handling machine, with electronic identification elements which are attached to the set-up elements of the construction and/or material-handling machine, and an electronic evaluation unit for determining the set-up state and/or location of the set-up elements based on information received from the identification elements. The invention further also relates to such a construction and/or material-handling machine, in particular in the form of a crane.

Construction and/or material-handling machines such as cranes, for example revolving tower cranes or telescopic boom mobile cranes, but also derrick cranes or maritime cranes such as ship loading cranes are often operated in various set-up states in which individual set-up elements such as boom parts, ballast elements, guyings or tower sections are being assembled or disassembled, additionally attached or mounted at various locations. On the one hand, this affects the load and with it the service life of the components. On the other hand, the set-up state also significantly affects the admissible lifting capacity of the crane, which must be taken into account by selecting appropriate load curves in the load monitoring device or by various configurations of the crane controller.

Up to now, it has been common practice to a large extent that the crane operator or assembler manually enters into the control system relevant key data of the set-up state during the crane installation, such as the total length of the assemblies, for example, the boom length, the tower height and the counter boom length, or even the number of mounted ballast elements, so that the control system could semi-automatically select the relevant load curves.

Recently, however, it has also been proposed to automatically monitor the set-up states of such a construction and/or material-handling machine by attaching appropriate monitoring devices or suitable sensor systems to the machine in order to detect the set-up machine elements and/or the assembly position of the installed machine elements.

For example, EP 17 24 230 B1 shows a crawler crane or crawler excavator in which the ballast elements that can be placed on the superstructure and the traction weights that can be placed on the undercarriage are each provided with an RFID tag. A reader reads the information provided by the RFID tags and transmits it to the control device, which then sets the overload protection accordingly.

Similarly, DE 10 2012 025 111 A1 provides for RFID transponders on the counterweights of a telescopic boom mobile crane as well as on a possibly mountable top boom, wherein a control unit of the crane uses the data transmitted by the RFID transponders to determine the set-up status and calculate load cut-off values.

The document DE 10 2014 018 063 A1 considers the determination of the set-up state of a crane by means of such RFID tags to be disadvantageous and wants to determine the set-up state of a crawler or mobile crane using a camera, which should enable an optical detection of characteristic set-up state parameters. For example, with the camera, there are to be determined the number of rope reevings on the lifting hooks or the number of ballast plates used on the superstructure.

The document EP 27 99 386 B1 proposes to determine the number of ballast weight plates provided on a crane by means of a weight sensor that determines the weight load on the steel structure of the superstructure.

Furthermore, WO 2017/162336 A1 describes a revolving tower crane on the lattice sections of which there are mounted the so-called RuBee tags, which transmit in the low-frequency range and transmit identification data to a control device, which determines the set-up status on the basis of the information received. As an alternative to such LWID elements communicating in the low-frequency range, the corresponding data can also be transmitted to the control device via optical fiber, which, however, requires appropriate optical fiber cabling with coupling pieces between the crane elements. The data transmission is to take place via multihop transmission.

Nevertheless, the energy supply required for data transmission to the identification elements is not entirely straightforward, especially in the case of construction and/or material-handling equipment such as cranes. On the one hand, large boom lengths and tower heights or corresponding machine dimensions produce significant distances between the information elements attached to remote set-up elements and the machine control system, so that wireless power transmission is not readily possible. In the case of RFID tags, the high-frequency radio waves of the RFID reader are known not only to transmit data, but also to supply the transponder with energy. However, this is only possible to a limited extent in terms of range and is also often impaired by the metallic components and the coverage caused thereby. Active RFID transponders having their own energy supply from a battery or accumulator can indeed mitigate the problem of range, but on the other hand suffer in that the energy cannot be stored for a sufficiently long time.

Several set-up elements, such as the tower sections and boom sections of a crane or other mechanical, often metallic structural components, are in fact very durable components that are often used for many years. In addition, construction machine components are often also stored for long periods of time in a storage location, for example, over the winter, which further wears down the batteries of such transponder chips.

Apart from said power supply related issues, problems can also arise in the transmission of information, for example in case of mutual interference of radio signals due to a large number of RFID chips or in case of interference from the environment. Especially with RFID tags attached to steel components, it is often not easy to keep the communication stable.

SUMMARY

It is the underlying object of the present invention to provide an improved method and an improved device for detecting the set-up state and/or the location of a set-up element as well as an improved construction and/or material-handling machine of the initially named kind, which avoid the disadvantages of the prior art and further develop the latter in an advantageous manner. In particular, due to large boom or tower lengths there is to be achieved stable communication with the information elements even at greater distances, thus enabling reliable determination of the set-up status or the location of the set-up elements and ensuring reliable operation even over a very long service life of the machine.

Said task is solved, in accordance with the invention, with a method as claimed in claim 1, a device as claimed in claim 4, and a construction and/or material-handling machine as claimed in claim 31. Preferred embodiments of the invention are the subject-matter of the dependent claims.

In order to maintain a sufficient energy supply for the identification elements attached to the set-up elements over a longer service life, which enables data transmission or communication even over longer distances, it is proposed that the energy accumulators of the identification elements be repeatedly recharged by Energy Harvesting. According to the invention the identification elements attached to the set-up elements are provided with energy-generating means for generating electrical energy from environmental influences, as well as an energy accumulator for storing the generated energy and supplying the identification elements. The set-up elements to which the identification elements are attached, as well as the identification elements themselves, are exposed to various environmental influences over their service life, such as mechanical stresses, exposure to sunlight and daylight, temperature impact or heat differences, which allow the energy accumulators of the identification elements to be topped up again and again.

In further development of the invention, in order to take advantage of as many energy generation opportunities as possible, said energy-generating means can comprise a plurality of differently operating energy-generating modules. By means of such a plurality of differently operating energy-generating modules, there can be utilized different environmental influences or from different environmental influences there can be generated energy in the form of electric voltage or electric current. The various energy-generating means can store the simultaneously or progressively generated energy into a common energy accumulator.

In particular, at least one of the identification elements attached to the set-up elements of the machine can be provided with at least one thermoelectric energy-generating module capable of converting thermal loads and/or thermal gradients on the set-up element and/or the identification element into electrical energy. In particular, the identification element can be provided with a Peltier element, which is attached with different, in particular mutually opposite surfaces to module sections that regularly or at least from time to time have different temperatures. By applying a temperature difference to the two sides of the Peltier element, electric current can be generated, sometimes referred to as the Seebeck effect. In particular, the Peltier element can be connected to a usually warm ambient element on the one hand and to a usually cold ambient element on the other hand via a thermally highly conductive material, for example a thermally conductive paste. These warm or cold environmental elements can form the immediate surroundings of the identification element or a part thereof. For example, this can be a section of a steel structural beam on the one hand and an electronic assembly of the identification element on the other.

Alternatively or in addition to such a thermoelectric energy-generating module, the identification element can also be supplied with electrical energy by means of an electromechanical energy-generating module. Such an electromechanical energy-generating module can, for example, include at least one piezo element capable of converting elastic deformations into electrical energy. Such a piezo element can be advantageously attached to or connected with a section of the respective set-up element to which the identification element is attached, which section is regularly subject to higher mechanical stresses or tensions and thus exhibits elastic deformations. For example, this can be a longitudinal beam or transverse strut of a lattice jig or another section of a set-up element that is subject to high stresses. For example, it may be useful to attach such a piezo element to a boom section and/or tower section of a crane to which a corresponding identification element is attached.

As an alternative or in addition to such a piezo element, which already responds to minor deformations, an electromechanical transducer can also pick up actuating movements of the set-up element occurring during machine operation and convert them into electrical energy. For example, this can be a dynamo or generator attached to a pivot bearing or a cable deflection roller.

Alternatively, or in addition to such an electromechanical energy-generating module, there can be provided a photoelectric energy-generating module that can convert incoming light such as solar radiation into electrical energy. Such a photoelectric energy-generating module can be attached directly to the identification element, but can also be attached to the set-up element at a distance therefrom to feed the identification element's energy accumulator.

Alternatively or additionally, the identification element can comprise an energy-generating module that generates electrical energy from near-field communication input to the identification element. In particular, there can be provided an energy-generating module.

The electrical energy generated by the energy-generating means can be stored in a common energy accumulator or in a plurality of separate energy accumulators. In this respect, there can be provided an energy control and/or management device to control or manage the storing and/or reclaiming energy to or from the at least one energy accumulator. Such electrical Power-Management can be connected to the at least one energy accumulator, on the one hand, and to the plurality of possibly different energy-generating means, on the other hand, in order to control the storing of the generated energy into the energy accumulator. On the other hand, the Power-Management can also be connected to an electric consumer such as a transmitting device for transmitting information in order to deliver energy provided from the energy accumulator to the consumer and/or to control the consumer supply.

In order to save energy or consume as little energy as possible, the energy control and/or management device can, for example, supply consumers such as the transmitting device with energy only within predetermined time windows and/or predetermined function requirements, wherein said time and/or function windows can be determined, for example, on the basis of a function assigned to the identification element or can be determined on the basis of stored logic, which can be stored, for example, in the identification element itself, for example, in the form of software. Alternatively or additionally, the energy control and/or management device can also enable the energy supply depending on an external signal received at the identification element, for example depending on an information retrieval signal coming from another identification element or another control device or remote station.

As energy accumulators there can be provided various storage modules such as a capacitor or an accumulator, wherein there can also be provided a combination comprising at least one capacitor and at least one accumulator. Said energy control and/or management device may thereby decide into which energy accumulator an energy provided by the energy-generating means is currently being stored, for example, based on the amount and/or duration of the energy generation. For example, low voltages and/or voltages provided over a long period of time, such as from a Peltier element, can be fed into the battery, while short-term and/or higher voltages, such as from a piezo element, can be fed to a capacitor.

Alternatively or additionally, a balance can also be provided between several energy accumulators, for example in that a short-term energy portion stored in the capacitor is stored by the latter in the battery.

In order to be able to transmit information efficiently, the identification elements can each have a communication device, preferably in the form of a transmitting/receiving device with at least one antenna device, in order to be able to transmit or receive information or signals wirelessly via the antenna device.

In order to be able to communicate with a respective remote station with low energy consumption, various antenna devices can advantageously be provided on a respective identification element.

In order to be able to transmit a respective information or signal in an energy-efficient manner, a transmission control device can select via which antenna device the respective signal is transmitted depending on the respective information to be transmitted.

In a further development of the invention, said antenna device may comprise a multi-frequency antenna on at least one of the identification elements, preferably on all identification elements, which can transmit and/or receive signals in different frequencies or frequency ranges. Said multi-frequency antenna can, for example, be configured to transmit and/or receive signals in various frequency ranges simultaneously, and such a multi-frequency antenna may, for example, be in the form of a Lakhovsky antenna. Alternatively or additionally, the multi-frequency antenna can also be configured to transmit selectively in one or the other frequency band.

Advantageously, a frequency control device can be assigned to the antenna device, which takes over a determination or selection of the frequency for data communication in order to then transmit and/or receive via the multi-frequency antenna in the desired frequency band.

Alternatively or additionally, said antenna device may include a directional antenna, for example, in the form of a radiocommunication antenna and/or a phased array antenna, i.e., a phased array antenna with directional effect that achieves bundling of the radiation energy by arranging and interconnecting individual radiators.

Alternatively or additionally, the antenna device can also comprise a near field antenna for near field communication, for example in the form of a near field radio antenna. By means of such a near field antenna, the information element can communicate, for example transmit information or receive signals, in particular with other information elements attached to the respective machine and/or other remote stations on the machine or in the immediate vicinity of the machine.

Alternatively or additionally, however, the antenna device can include a position location antenna to receive signals from a position location system, such as a navigation satellite.

Alternatively or in addition to a GPS positioning device, however, a respective information element can also have a positioning device for determining position that operates in a different manner. For example, the positioning device can comprise a mobile radio device with position determination, for example to determine in which mobile radio cell the information element is located in each case and/or, when receiving multiple mobile radio signals, to determine at which point or in which area between multiple mobile radio masts the respective information element is located. Such mobile radio location methods, for example comprising a triangulation determination, are known per se and can be used to determine from the known locations of a plurality of radio cell towers or antennas and the strength and/or direction of the respective signals exactly where the mobile radio device provided at the information element is located.

Alternatively or additionally, the positioning device can also comprise a position determining device for determining the position relative to the other information elements, wherein such position determination may be performed, for example, by means of a propagation time measuring device which may measure the propagation time of the signals between the information elements.

In order to save energy during data communication and not to have unnecessarily long transmission distances and thus require transmission power, in an advantageous further development of the invention it can be provided that at least some of the information elements communicate or can be connected serially with one another in order to transmit information in the manner of an information chain from information element to information element. In particular, the information elements can form a daisy chain system, which transmits information serially from information element to information element and from an information element to the evaluation unit mentioned at the beginning or to another external data processing device, wherein such an external data processing device can be provided on the construction and/or material-handling machine or also separately therefrom.

Advantageously, the information elements can be configured in such a way that information and/or signals to be transmitted can be strung together and/or data packets to be transmitted can be adapted dynamically. For example, an information element that has to transmit its own information and also "foreign" information from a neighboring information element can transmit only one data packet that contains both its own and the foreign information. For example, if the reception time of a signal is to be reported back to a first identification element and to a second identification element, the second identification element can transmit its reception time and its identification information to the first information element, which then retransmits a data packet containing, on the one hand, the identification code and the reception time of the second element and, on the other hand, the reception time and the identification code of the first element.

A dynamic telegram adaptation and a stringing together of information to be transmitted in a daisy chain structure makes it possible to determine the sequence of the individual assemblies and identification elements.

Advantageously, all information or data of the identification elements or a subgroup of identification elements can be combined in a higher-level system, for example a machine control system or a cloud.

In particular, said evaluation unit, which can be implemented in said higher-level system, for example the machine control system or a cloud, but can also be configured separately therefrom and/or assigned to one of the identification elements, can determine the set-up state of the construction and/or material-handling machine or the position of the identification elements and the set-up elements identified therewith. This allows the complete life cycle of a set-up element to be traced.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
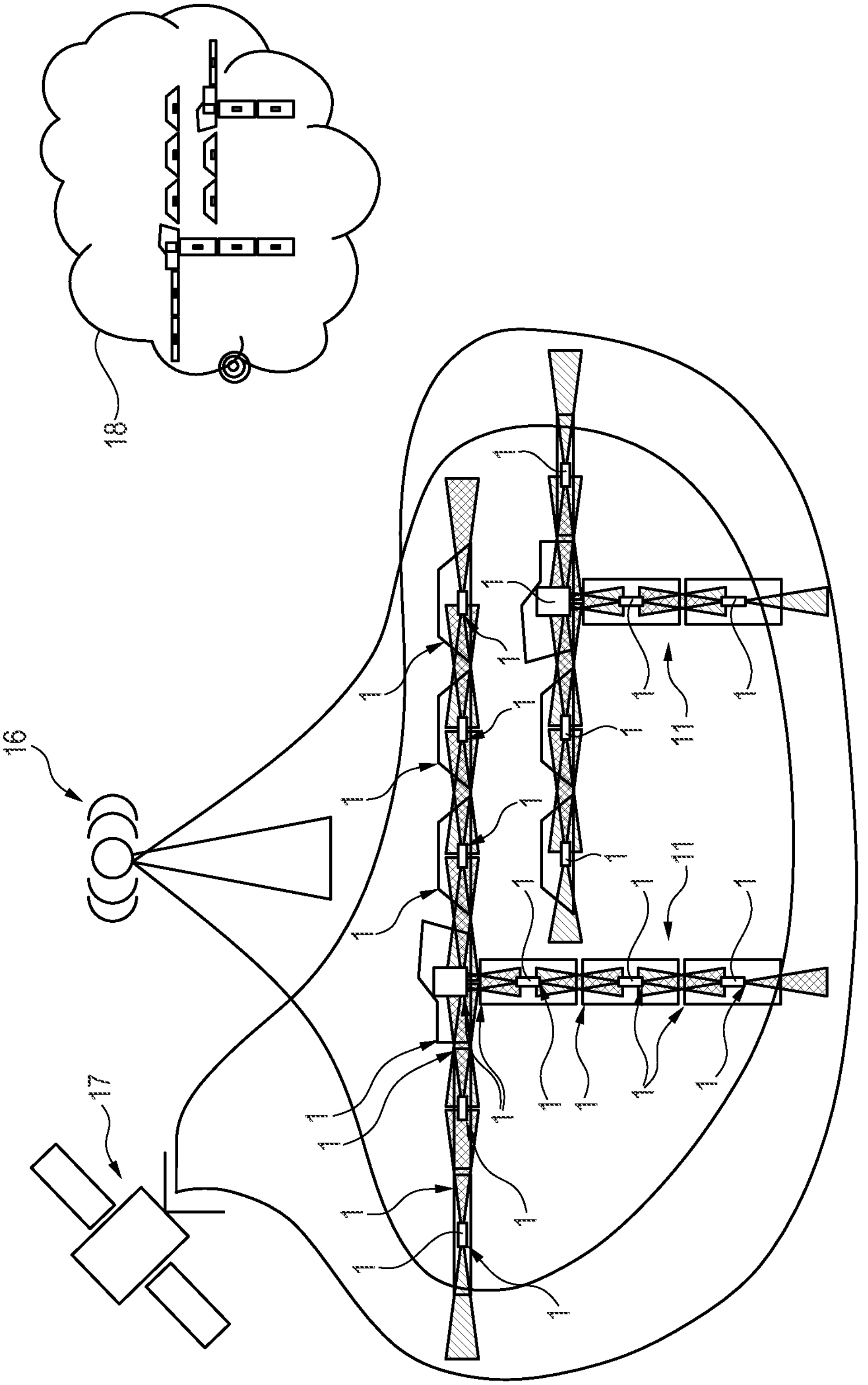
FIG. 1 shows a representation of two construction and material-handling machines in the form of revolving tower cranes, the set-up elements of which, comprising tower sections and boom sections and ballast elements, are each provided with an identification element, showing the communication paths between the identification elements and the communication paths to a tracking system, a mobile radio system and a cloud.

As FIG. 1 shows, the construction and/or material-handling machine 11 can be in the form of a crane, for example in the form of a revolving tower crane, and can comprise a plurality of set-up elements 12 from which the construction and/or material-handling machine 11 can be constructed. Typically, the set-up elements 12 can be provided variably and/or installed at various locations so that the machine can be operated in various configurations depending on the presence, number and mounting position of the set-up elements 12.

Such set-up elements 12 can be, in particular, mechanical structural components such as structural steel members, guyings, ballast weights, and similar. In a crane, for example, the set-up elements 12 may comprise boom sections and/or tower sections from which the boom 13 or tower 14 of the crane may be assembled. Depending on the crane type, these can be, for example, a truss carrier, telescopic apron or tower segments or boom segments.

Other set-up elements 12 can comprise ballast weights, upper and/or lower undercarriage elements, guying elements, or other assemblies of the respective construction and/or material-handling machine 11.

As FIG. 1 shows, electronic identification elements 1 can be attached to said set-up elements 12, in particular rigidly attached, which can be done, for example, by gluing or in another way. Advantageously, at least one identification element 1 is permanently assigned to each set-up element 12.

Said identification elements 1 can be in the form of ID labels or smart labels that are affixed to the respective set-up element 12.

Figure 2:
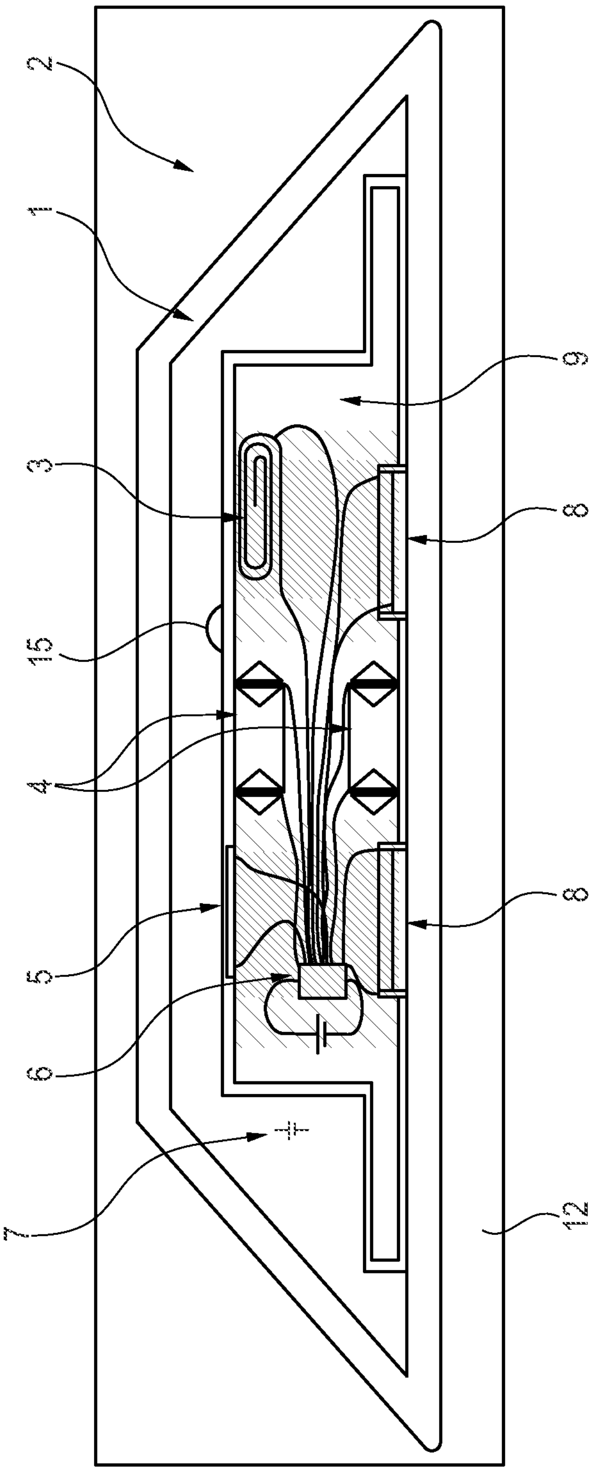
FIG. 2 shows a representation of one of the identification elements of FIG. 1 in a detailed view showing energy-generating modules, an energy accumulator, and an energy management device of the identification element.

As FIG. 2 shows, the identification elements 1 can comprise electronic data processing and/or communication equipment to process and/or store and/or transmit and/or receive information. Advantageously, the identification element 1 can comprise data processing logic, for example in the form of hard wiring or in the form of a program stored in a program memory, which can be processed by a microprocessor.

In order to be self-sufficient in energy over a long period of time, even under unfavorable conditions, the identification element 1 comprises energy-generating means 10 that can generate energy from the environment surrounding the identification element 1. Said energy-generating means 10 can thereby advantageously comprise a plurality of energy-generating modules operating in different ways to be able to convert various environmental influences into electrical energy.

As FIG. 2 shows, the energy-generating means 10 can advantageously comprise at least one thermoelectric energy-generating means 8, or can, for example, be in the form of a Peltier element.

Advantageously, such a thermoelectric energy-generating module 8 can on the one hand be connected to a usually warm ambient element and on the other hand to a usually cold ambient element via a thermally highly conductive material, for example a thermally conductive paste 9. For example, one side of the Peltier element or the thermoelectric energy-generating module 8 can form part of the mounting surface of the identification element 1, which mounting surface is connected to the set-up element 12, for example is flatly connected to the surface of the set-up element 12, or is glued on. If the set-up element 12 is a metal component, it is subject to major temperature fluctuations, for example great heat when exposed to sunlight or great cold at night or cold outside temperatures.

Another surface of the thermoelectric energy-generating module 8, in particular an opposite surface of the Peltier element can be connected, for example, to the inside of the electronic element 1, in particular to its data processing and/or transmitting devices, via said conductive material 9.

The temperature gradient applied to the two surfaces of device 8 is converted into electrical energy by device 8.

Alternatively, or in addition to such a thermoelectric energy module 8, the energy-generating means 10 may advantageously also comprise at least one mechanical electrical energy-generating module 4, for example in the form of a piezo element. Such a mechanical-electrical energy-generating module 4 may be integrated into the identification element 1 and/or connected to surrounding components to undergo deformations of the identification element 1 and/or a respective surrounding component, or to be deformed by such deformations. As FIG. 2 shows, for example, a mechanical-electrical energy-generating module 4 may be attached to the connection surface of the identification element 1, which is flatly connected to the respective set-up element 12. Alternatively or additionally, another mechanical-electrical energy-generating module 4 may be integrated into the housing and/or into the interior of the identification element 1 to undergo a corresponding deformation when the element 1 is deformed and/or strained. Said mechanical deformation is converted into electrical energy.

Alternatively or additionally, at least one photoelectric energy-generating module 5 may also be provided, which can be attached to an outer side or outer housing of the identification element 1 to capture ambient light falling on the identification element 1, in particular to capture solar radiation or light. The captured light is converted into electrical energy by device 5.

Alternatively or additionally, the identification element 1 may also comprise an inductive energy-generating module 3, for example in the form of a coil, to convert communication signals or waves acting on the identification element 1 from the environment, such as near field communication signals or radio signals, into energy.

The various energy-generating modules of the energy-generating means 10 are advantageously connected, via an energy control and/or management device 6, to at least one energy accumulator 7 in which the electrical energy generated by said modules can be stored. In this respect, said energy control and/or management device 6 can, for example, limit the storing of energy, for example if a plurality of energy-generating modules provide more energy than can be stored in the energy accumulator 7. Alternatively or additionally, said energy control and/or management device can distribute the electrical energy provided by the energy-generating means 10 to various energy accumulators 7, which may be controlled in the manner explained at the beginning, for example, depending on the amount and/or the expected duration of energy generation.

Said energy control and/or management device 6 can also be connected in a reverse manner to consumers of the identification element 1, in order to control their energy supply and/or the reclaiming of energy from the energy accumulator 7.

Such a consumer may be, for example, a communication device 15 that may include a data transmitting device and/or a data receiving device to transmit and/or receive information.

In order to be able to communicate with different remote stations, said communication device 15 can advantageously have various antenna devices 16. For example, the antenna device 16 may include a multi-frequency antenna and/or a directional antenna, for example in the form of a phased array antenna or a radiocommunication antenna, and/or a near field communication antenna and/or a cellular communication antenna and/or a GPS and/or tracking antenna for communicating with a navigation satellite or other positioning device.

As FIG. 1 shows, the identification elements 1 can advantageously communicate with one other or with each other, which can be done, for example, via the near field communication antenna of the communication device 15. Alternatively or additionally, said identification elements 1 or at least one of said identification elements 1 can communicate with a mobile radio device 17 and/or with a navigation satellite 17 or with another positioning device, for example in the form of a radio tower.

Alternatively or additionally, the communication device 15 of at least one identification element 1 can be configured to communicate with a cloud 18 in which the information or data of all identification elements 1 can be stored.

In further development of the invention, it is also possible that not the identification elements 1 themselves, but an interposed communication device, for example a communication module of a machine control, for example the crane control device, communicates with said navigation satellite 17 and/or the mobile radio device 16 and/or the cloud 18 in order to forward or transmit data received from the identification elements 1 thereto or, conversely, to receive information from said devices and forward it to the identification elements 1 or transmit it in a processed form.

In order to save energy for communication, the communication device 15 of at least one identification element 1 may include a radio power control device 19 that increases or decreases or turns off the radio power depending on how much radio power is needed. This can be controlled, for example, as a function of the distance to an adjacent identification element 1 or to another remote station, and/or as a function of a transmit function to be performed and/or as a function of a received information signal.

Advantageously, said radio power control device 19 is designed to transmit radio signals only in the environment necessary for the task at hand. In particular, crossings between element groups can be avoided. In addition, it is advantageous to transmit with the lowest possible power and thus to save energy.

Alternatively or additionally, the communication device 15 may be configured to adapt the transmission frequencies to the environment in order to establish radio links to different remote stations and to keep the communication stable.

In further embodiments of the invention there is provided a position determining device 20 which may be integrated into one or each of the identification elements 1 and/or provided on an external data processing module of the construction and/or material-handling machine 1 such as a crane control device.

By means of such a position determining device 20, there can be determined the exact position of a respective identification element 1 and thus of the set-up element 12 identified thereby. Said position determining device 20 may be configured to operate in various ways. For example, the position determining device 20 may perform GPS positioning, for example by evaluating a navigation satellite signal received in the respective identification element 1. Alternatively or additionally, the position determining device 20 can determine the position of the identification element 1 receiving the signal from the mobile radio signal received by the mobile radio device 16, for example with the aid of triangulation techniques and/or with the aid of directional techniques.

Alternatively or additionally, the position determining device 20 may also determine the position of the identification elements 1 by measuring the propagation time of the radio signals between the elements 1.

In order to save energy, the identification elements 1 are advantageously configured to send only the most necessary data of a predetermined time period, such as a tag, in order to obtain the shortest possible transmission cycles and to save energy. Advantageously, a dynamic telegram adaptation is carried out and/or information is strung together, for example, in the manner of a daisy chain structure.

Figure 3:
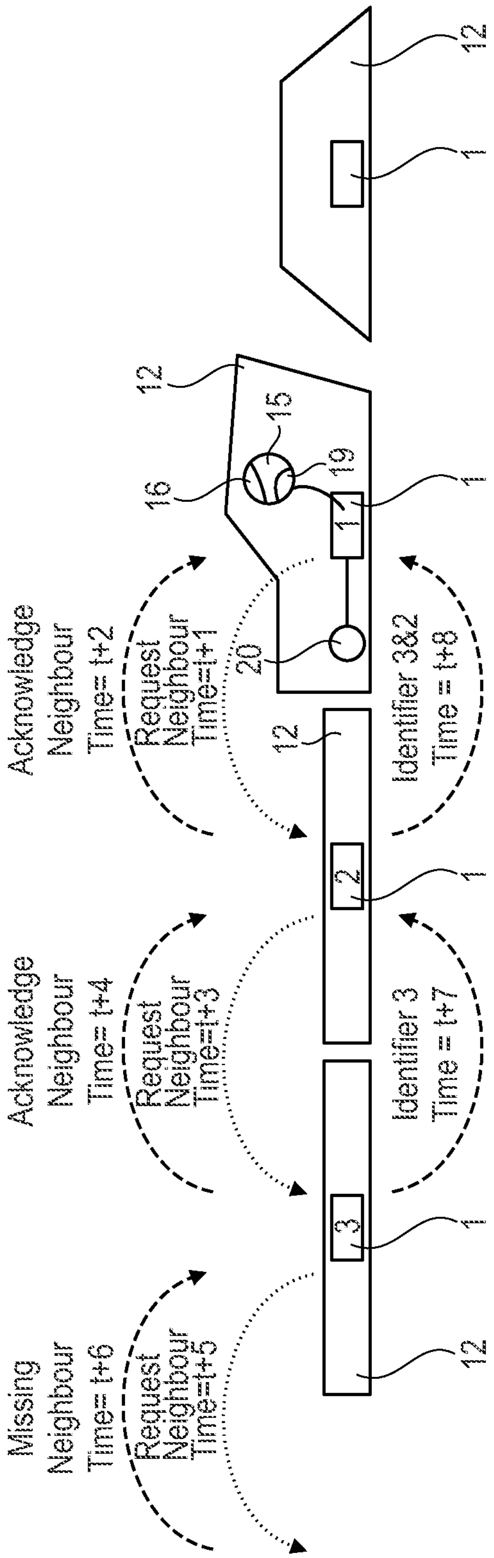
FIG. 3 shows a representation of the identification elements attached to the boom sections of one of the revolving tower cranes of FIG. 1 and their communication with each other, illustrating the daisy chain system formed by the identification elements.

Such a stringing together of information advantageously also makes it possible to determine the sequence of the individual assemblies and elements, as shown in FIG. 3.

Advantageously, an interrogation initiated by a first identification element can be forwarded by a second identification element to a third identification element up to an nth identification element, in each case the reception time and/or runtime of the interrogation signals and/or the reception confirmation signals being determined and sent back, cf. FIG. 3. On the basis of the signal propagation times and/or reception times and/or on the basis of the dynamically assembled data packets, which may comprise, for example, the sum of the identification codes of the individual elements in a predetermined sequence, there can be determined the sequence and/or the spacing of the elements 1.

All information of the elements 1 can advantageously be combined in a higher-level system, for example a machine control, which can be a crane control, or a data cloud, as shown in FIG. 1.

Figure 4:
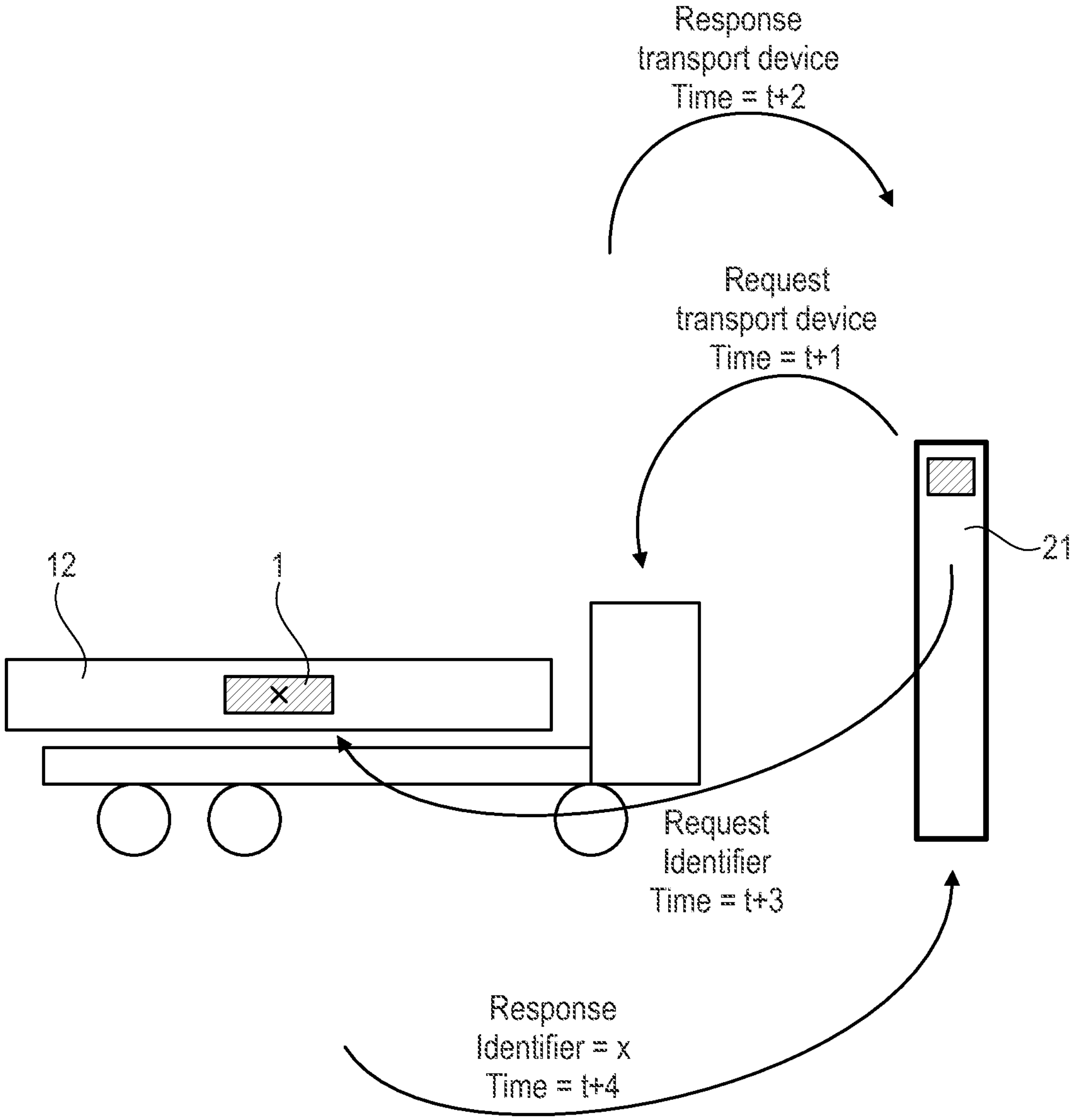
FIG. 4 shows a representation of one of the set-up elements of the construction and material-handling machine of FIG. 1 during loading or unloading at a storage location, showing the transmission of information between the identification element attached to the set-up element and a registration station at the storage location.

Furthermore, the identification elements can also be used to determine a storage location of the respective set-up element 12 if the set-up element 12 is not installed on a machine but is stored in a storage location. As FIG. 4 shows, there can be determined the position of a respective identification element 1 and thus of a corresponding set-up element 12, for example, in said manner via mobile radio positioning and/or GPS satellite navigation positioning. Alternatively or additionally, however, the position determining device 20 can also evaluate a central radio station 21 of the storage location, possibly in a refined manner via directional radio.

Figure 5:
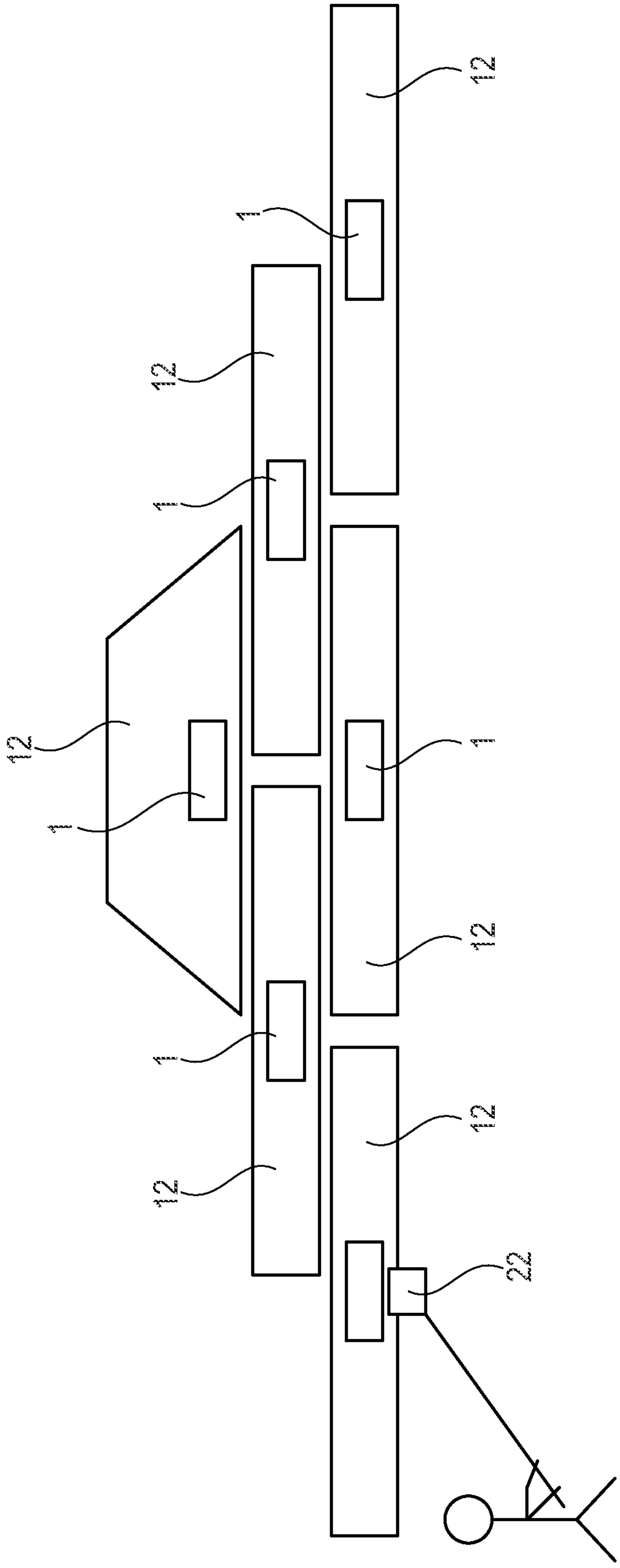
FIG. 5 shows a representation of the set-up elements stored at the storage location with the identification elements attached to them, wherein there is shown the reading of the information of the identification elements by means of a hand-held transmitter or receiver.

Alternatively or additionally, communication can also take place with a hand-held transmitter 22, with the aid of which the set-up elements 12 or the identification elements 1 attached to them can be scanned or located at their storage location, cf. FIG. 5.

We claim:

1. A method for detecting the assembly status and assembly position of structural elements of a construction and/or material-handling machine comprising a crane, wherein the construction and/or material-handling machine is assembled from the structural elements, the method comprising:

transmitting information from electronic identification elements attached to the structural elements to an electronic evaluation unit, wherein each of the electronic identification elements comprises an energy-generator and an energy accumulator;

determining the assembly status and the assembly position of the structural elements by the electronic evaluation unit on the basis of the information received from the electronic identification elements, wherein determining the assembly status of the structural elements comprises determining, via the electronic evaluation unit, the presence and absence of the structural elements that the construction and/or material-handling machine does and does not comprise, respectively, and wherein determining the assembly position of the structural elements comprises determining, via the electronic evaluation unit, the assembly position of the structural elements that are present in the construction and/or material-handling machine;

supplying each respective electronic identification element with electrical energy from its respective energy-generator;

converting environmental influences acting on each respective electronic identification element into electrical energy via each respective energy-generator; and storing the electrical energy generated by each respective energy-generator in each respective energy accumulator such that each of the electronic identification elements is self-sufficiently powered from its respective energy accumulator.

2. The method of claim 1, further comprising:

supplying at least one of the electronic identification elements with electrical energy by differently operating energy-generating modules; and converting different environmental influences into electrical energy by the differently operating energy-generating modules.

3. The method of claim 2, further comprising:

storing the electrical energy generated by the differently operating energy-generating modules in a common energy accumulator; and providing the electrical energy from the common energy accumulator to consumers of the electronic identification elements.

4. A device for detecting the assembly status and assembly position of structural elements of a construction and/or material-handling machine comprising a crane, wherein the construction and/or material-handling machine is assembled from the structural elements, the device comprising:

electronic identification elements attached to the structural elements of the construction and/or material-handling machine; and an electronic evaluation unit for determining the assembly status and the assembly position of the structural elements on the basis of information received from the electronic identification elements such that the electronic evaluation unit is configured to determine the presence and absence of the structural elements that the construction and/or material-handling machine does and does not comprise, respectively, and such that the electronic evaluation unit is configured to determine the assembly position of the structural elements that are present in the construction and/or material-handling machine, wherein each of the electronic identification elements comprises energy-generators for generating electrical energy from environmental influences acting on the respective electronic identification element, and wherein each of the electronic identification elements comprises an energy accumulator for storing the generated energy and supplying the stored energy to consumers of the electronic identification elements such that each of the electronic identification elements is self-sufficiently powered from its respective energy accumulator.

5. The device of claim 4, wherein the energy-generators comprise a plurality of differently operating energy-generating modules.

6. The device of claim 5, wherein the energy-generating modules are connected to a common energy accumulator from which consumers of the electronic identification element are supplied.

7. The device of claim 5, wherein at least one of the plurality of differently operating energy-generating modules forms part of a mounting surface of the electronic identification element by which the electronic identification element is attached to the respective structural element.

8. The device of claim 4, wherein the energy-generators comprise a thermoelectric energy-generating module for converting a temperature difference into electrical energy, wherein the thermoelectric energy-generating module comprises a Peltier element.

9. The device of claim 4, wherein the energy-generators comprise an electromechanical energy-generating module for converting mechanical deformations and/or movements into electrical energy, wherein the electromechanical energy-generating module comprises a piezo element.

10. The device of claim 4, wherein the energy-generators comprise a photoelectric energy-generating module for converting ambient light into electrical energy, wherein the photoelectric energy-generating module comprise a photosensitive cell.

11. The device of claim 4, wherein the energy-generators comprise an inductive energy generator.

12. The device of claim 4, wherein the energy-generators are integrated into the electronic identification element within an element housing or on the element housing.

13. The device of claim 4, further comprising an energy control and/or management device connected to the energy-generators and the energy accumulator, and is configured to control the storing and/or reclaiming energy to/from the energy accumulator in dependence on at least one operating function and/or operating parameter of the electronic identification element.

14. The device of claim 13, wherein the energy control and/or management device is configured to control and/or distribute the storage of energy from the energy-generators into the energy accumulator depending on an expected duration and/or amount of energy generation.

15. The device of claim 13, wherein the energy control and/or management device is configured to control the supply of energy from the energy accumulator to at least one consumer of at least one electronic identification element as a function of an operating function of the electronic identification element and/or as a function of an information signal received from the electronic identification element.

16. The device of claim 15, wherein the energy control and/or management device is configured to supply the consumer with energy only when a functional logic of the electronic identification element requires an information transmission or an information request signal has been received from the electronic identification element, and wherein the consumer comprises a transmitting device of the electronic identification element.

17. The device of claim 4, wherein the electronic identification elements each comprise a communication device comprising an antenna device.

18. The device of claim 17, wherein the communication device is connected to a radio power control device which is configured to increase or decrease the radio power of the communication device in dependence on the information to be transmitted and/or in dependence on the remote station to which information is to be transmitted.

19. The device of claim 17, wherein the antenna device comprises a plurality of antennas for communicating with different remote stations, and wherein the antennas are differently configured.

20. The device of claim 19, wherein the antenna device comprises a multi-frequency antenna for transmitting and/or receiving in different frequency bands.

21. The device of claim 17, wherein the antenna device comprises at least one directional antenna comprising a radiocommunication antenna or a phased array antenna.

22. The device of claim 17, wherein the antenna device comprises a near field antenna.

23. The device of claim 17, wherein the antenna device comprises a satellite antenna for receiving signals from a navigation satellite.

24. The device of claim 4, further comprising a position determining device for determining the positions of the electronic identification elements.

25. The device of claim 24, wherein the position determining device comprises a satellite navigation element for evaluating satellite signals received at the electronic identification elements.

26. The device of claim 24, wherein the position determining device comprises a mobile radio positioning device for evaluating mobile radio signals received at the electronic identification elements and determining the position of the electronic identification elements from the received mobile radio signals.

27. The device of claim 24, wherein the position determining device comprises a propagation time determining device for determining the positions of the electronic identification elements from the propagation times of signals between the electronic identification elements.

28. The device of claim 4, wherein the electronic identification elements form a serial transmission structure and are configured to transmit information received from an adjacent electronic identification element to a further, adjacent electronic identification element and, in doing so, dynamically adapt an information block to be transmitted to the received information.

29. A system comprising the device of claim 4 and a permanently installed transmitting and/or receiving device at a storage location for receiving information from electronic identification elements located at the storage location.

30. A system comprising the device of claim 4 and a mobile, manually movable transmitting and/or receiving device at a storage location for receiving information from electronic identification elements located at the storage location.

31. A construction and/or material-handling machine comprising the device of claim 4.

* * * * *